(12) United States Patent
Schubert

(10) Patent No.: US 9,190,823 B2
(45) Date of Patent: Nov. 17, 2015

(54) WIND ENERGY PLANT HAVING A TWISTABLE NACELLE CABLE GUIDE

(75) Inventor: Matthias Schubert, Rendsburg (DE)

(73) Assignee: SENVION SE, Hamburg (DE)

( * ) Notice: Subject to any disclaimer, the term of this patent is extended or adjusted under 35 U.S.C. 154(b) by 959 days.

(21) Appl. No.: 13/257,857

(22) PCT Filed: Mar. 22, 2010

(86) PCT No.: PCT/EP2010/001789
§ 371 (c)(1),
(2), (4) Date: Sep. 20, 2011

(87) PCT Pub. No.: WO2010/105852
PCT Pub. Date: Sep. 23, 2010

(65) Prior Publication Data
US 2012/0006578 A1 Jan. 12, 2012

(30) Foreign Application Priority Data
Mar. 20, 2009 (DE) .......................... 10 2009 013 728

(51) Int. Cl.
*F03D 11/00* (2006.01)
*H02G 11/00* (2006.01)

(52) U.S. Cl.
CPC .............. *H02G 11/003* (2013.01); *F03D 11/00* (2013.01); *F03D 11/0066* (2013.01); *Y02E 10/722* (2013.01); *Y02E 10/726* (2013.01)

(58) Field of Classification Search
CPC .............. F03D 11/0066; F03D 11/005; F03D 11/0058; H02G 11/003
See application file for complete search history.

(56) References Cited

U.S. PATENT DOCUMENTS 4,070,083 A * 1/1978 DiPalma ....................... 439/452

FOREIGN PATENT DOCUMENTS

| DE | 201 16 756 | 1/2002 |
|----|------------|--------|
| EP | 1 921 311 | 5/2008 |
| JP | 2005-137097 | 5/2005 |
| JP | 2008-298051 | 12/2008 |
| WO | WO-00/36724 | 6/2000 |

OTHER PUBLICATIONS

International Search Report and Written Opinion mailed Nov. 30, 2010, directed to International Application No. PCT/EP2010/001789; 8 pages.

* cited by examiner

*Primary Examiner* — Nathaniel Wiehe
*Assistant Examiner* — Jeffrey A Brownson
(74) *Attorney, Agent, or Firm* — Morrison & Foerster LLP

(57) ABSTRACT

A wind energy installation includes a tower and a nacelle arranged at the top of the tower such that it can swivel in the azimuth direction. The installation also includes a plurality of cables which are guided via a loop from the tower into the nacelle, the cables being held at a distance from one another in the loop by means of rotationally fixed and loose holders. The holders each have receptacles for attachment of the cables with a predetermined circumferential separation. The holders include a lower rotationally fixed guide ring and an aligning upper loose guide ring. A loop guide is formed such that the loop is subdivided by means of the rotationally fixed lower guide ring into a curved untwisted area and an extended twisted area.

18 Claims, 6 Drawing Sheets

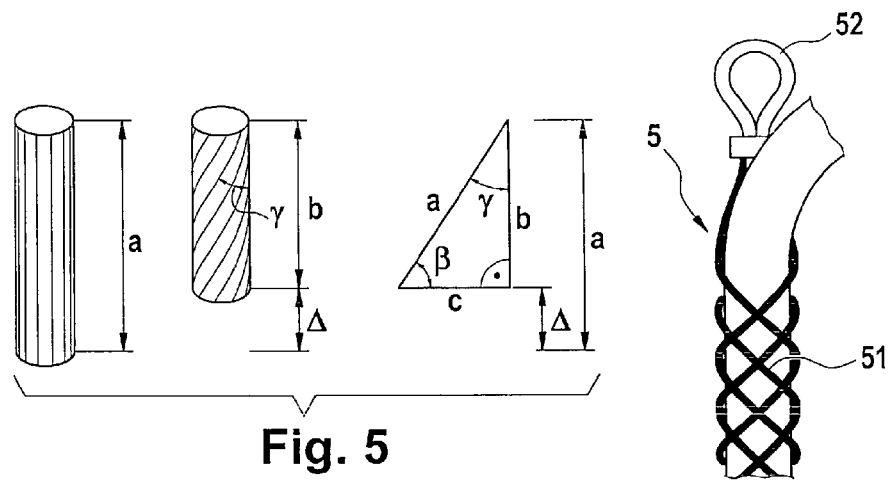
Fig. 5
Fig. 6
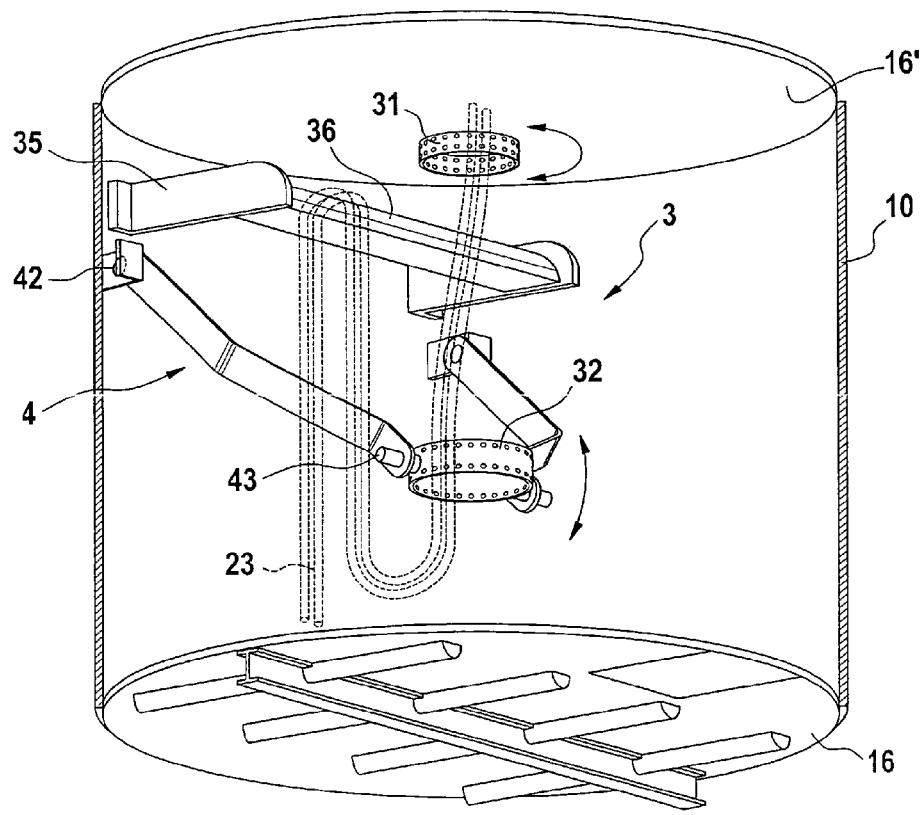
Fig. 7

WIND ENERGY PLANT HAVING A TWISTABLE NACELLE CABLE GUIDE

REFERENCE TO RELATED APPLICATIONS

This application is a national stage application under 35 USC 371 of International Application No. PCT/EP2010/001789, filed Mar. 22, 2010, which claims the priority of German Patent Application No. 10 2009 013 728.9, filed Mar. 20, 2009, the contents of which prior applications are incorporated herein by reference.

FIELD OF THE INVENTION

The invention relates to a wind energy installation having a tower and a nacelle which is arranged at the top on the tower such that it can swivel. A plurality of cables lead from there into the tower, to be precise in the form of a loop. The cables allow the nacelle to swivel in the azimuth direction, by twisting.

BACKGROUND OF THE INVENTION

In the case of modern types of wind energy installations with a horizontal rotor axis, alignment with the wind is necessary. This is done by swiveling the nacelle with respect to the fixed tower in the azimuth direction, in order in this way to slave it to the main wind direction. In this case, during operation, various azimuth directions are moved to in a randomly distributed sequence, corresponding to the stochastic wind direction distribution. In the process, the nacelle frequently carries out more than one complete revolution relative to the tower. This places stringent demands on the electrical transmission devices between the tower and the nacelle.

Attempts have been made to use rotary transmitters based on the principle of sliprings (DE 20116756 U1). Although these offer the advantage of a theoretically unlimited rotation capability, this advantage is, however, in practice, cancelled out because the wear is not negligible. Furthermore, at high current levels, such as those which typically occur in the power cables, sliprings are sensitive to dirt and resistance increases produced by it. Overall, they have therefore not been proven suitable for reliable long-term operation.

In order to avoid these disadvantages, the cable itself is used as a transmitter by being guided in a hanging loop from the tower into the nacelle. The loop allows the cable to be twisted well, although without an unlimited rotation capability. In practice, it has been found that it is sufficient to design the nacelle to be able to rotate through two or three revolutions in each direction. If the cable does not become untwisted on its own given operation as the wind rotates back, then it must be specially untwisted, by swiveling the nacelle, when a maximum rotation angle is reached.

The second-mentioned variant with the loop has been widely implemented. However, it has been found that particularly in the case of high-performance wind energy installations having a multiplicity of cables, this results in the difficulty that the individual cables rub against one another as they twist, and are therefore subject to excessive wear. This results in the risk of damage to the cables, which can lead to damage to the wind energy installation, for example as a result of a short circuit.

In order to avoid such damage, it is known for star-shaped spacers to be provided for the cables (WO 00/36724 A2). The cables are clamped thereon and are therefore fixed in their relative position. In order to allow the cable run to twist, a loop is formed, whose upper end is held on the nacelle, and whose other end is held on the tower. Furthermore, intermediate spacers are provided which are each attached to the tower via a guide which can swivel, and guide the cable run such that it can move partially. The guides require a large amount of physical space, and are complex.

SUMMARY OF THE INVENTION

The invention is based on the object of improving a wind energy installation of the type mentioned initially by providing improved cable transmission between the tower and the nacelle, which is less complex.

The solution according to the invention consists in the features broadly disclosed herein. Advantageous developments are the subject matter of the disclosure.

In the case of a wind energy installation having a tower and a nacelle which is arranged at the top on the tower such that it can swivel in the azimuth direction, having a plurality of cables which are guided twistably via a loop from the tower into the nacelle, with the cables being held at a distance from one another in the loop by means of rotationally fixed and loose holders, and with the holders each having receptacles for attachment of the cables with a predetermined circumferential separation, the invention provides that the holders comprise a lower rotationally fixed guide ring and an aligning upper loose guide ring and a loop guide is formed such that the loop is subdivided by means of the rotationally fixed lower guide ring into a curved untwisted area and an extended twisted area.

The essence of the invention is the idea of not only controlling the relative position of the individual cables with respect to one another by means of the holders, but also to control the nature of the movement of the cable run in its entirety, as made possible by the loop guide, thus creating a functional separation between twisting and shortening (length compensation). This is based on the discovery that, when the nacelle is swiveled, only the twisted area of the cable is shortened, to be precise because of the helical deformation of the individual cables. In the case of conventional loops, the twisting extends into the curved area of the loop as well, however, as a result of which the curved area is also shortened. This area is therefore subject to a double load, specifically twisting and shortening. The wear in this area is therefore high. This is the point of the invention which provides for the twisting originating from the nacelle to be stopped by means of the lower guide ring, which is arranged in a rotationally fixed manner, thus protecting that curved area of the loop which is located remotely from the nacelle from twisting. There is therefore a clear functional separation between the extended and the curved area of the loop: the extended area is twisted and can be shortened in the process, while the curved area is used solely for length compensation, to assist the stretched area. This means that, because of the invention, the loop now has to absorb only the load which results from its function for length compensation, but no longer has to absorb the load resulting from twisting. The double load which causes wear to the curved area of the loop can in this way be prevented in a simple manner, but effectively.

The invention therefore achieves an enormous reduction in the cable wear, particularly in the critical curved area of the loop. This was not protected against twisting in the design according to the prior art, but participated in it in an uncontrolled manner.

A number of the terms used will be explained in the following text.

Aligned means that the guide rings lie on a line. This does not require coaxiality, but it should be sufficient for the center of the area which is circumscribed by the loose guide ring to be located within the area which is circumscribed by the fixed guide ring.

A guide ring is rotationally fixed which does not change its angular orientation during swiveling. In contrast, loose means that the guide ring changes its angle orientation in a corresponding manner during swiveling (this may but need not be a complete rotation at the same time).

A loop means a cable guide between the tower and the nacelle, which extends from a curved area (which frequently forms a semicircle) and a stretched area, which extends essentially in a straight line in the direction of the orientation of the loop. The orientation of a loop is in this case governed by the direction which the open side of the curved area faces.

An opposing loop is a cable section which runs in the form of a loop and is oriented in the opposite direction to the loop which runs between the nacelle and the tower.

Compensation means compensation which does not necessarily need to be complete, but which should be at least half complete.

In the case of relatively large and less elastic cables, particularly those with a diameter of more than 15 mm, it has been proven to use a dedicated length compensation device. The laying of the cables in a loop between the tower and the nacelle offers per se the required freedom of movement to compensate for the shortening in the effective cable length resulting from the twisting. In the case of large and non-elastic cables, this is, however, also not sufficient, as a result of which the effective cable length can be shortened by the dedicated length compensation device, without having to load the cables. One proven embodiment of the length compensation device is in the form of a variable-travel direction changing element, around which the loop is placed. During twisting, the loop is made smaller by raising the direction changing element, thus shortening the effective cable length while, during untwisting, the loop is enlarged again by lowering, thus once again increasing the effective cable length.

The length compensation device may be designed to be passive or active. In this case, passive means that it reacts automatically to the shortening of the effective cable length. One preferred embodiment is the arrangement of the loop direction change on a rocker, as a result of which the loop size is decreased or increased, as described above, by raising or lowering the rocker. In order to relieve the rocker of the weight force of the hanging section, it is preferable to provide a separate direction change, which forms an opposing loop. This allows the rocker to react more sensitively to length shortening resulting from twisting. Alternatively or additionally, it is also possible for the rocker to be provided with a counterweight, in order to at least partially compensate for the effect of the weight force of the hanging section.

In the case of an active length compensation device, a control device is expediently provided, which governs the effective shortening of the cable resulting from the twisting and operates an actuator such that the loop is correspondingly made smaller or larger. In this case the effective shortening can be determined directly or indirectly. It is therefore possible to provide a sensor which determines the tensile force acting on the loop as a result of the twisting; it is also possible for the twisting to be determined—by means of dedicated sensors or by calculations—and for the expected effective shortening to be determined from this on the basis of the cable parameters. The latter offers the advantage that no additional sensors are required, and instead the data value, which is generally available in any case in the operating control system for the twisting state, can be used for this purpose. When maximum twisting or else maximum shortening is reached, the cable run is untwisted again by deliberately swiveling the nacelle.

A two-sided bearing is preferably provided for the lower guide ring. This can securely stabilize the lower guide ring even when subject to high twisting moments, therefore protecting the curved area of the loop against the undesirable load from twisting. A diametrically opposite arrangement of the bearing is particularly expedient. The bearing preferably allows tilting about a horizontal axis, for example by use of diametrically opposite bearing journals. Tilting allows advantageous guidance of the cables in the loop independently of the shortening resulting from twisting and the corresponding position of the length compensation device. It therefore makes a further contribution to load reduction.

In the simplest case, two guide rings are sufficient, one at the top and one at the bottom. However, it is also possible to provide one or more further guide rings (intermediate rings) which are arranged in between. This offers the advantage that, even in the case of relatively long cables and large cable diameters, it is possible to maintain the desired helical position. In general, the additional guide rings are arranged loosely, in order that they can also rotate to a different extent, depending on their positioning, between the upper and lower guide rings.

In order to achieve maximum twisting, it is advantageous for the individual cables to be arranged at approximately equal intervals on the envelope surface of the guide rings. The separation minimizes the risk of excessive heating resulting from the current-carrying cables being concentrated. Individual positions may remain free in order in this way to provide space for accommodation of components for attachment or bearing of the guide rings. The cables are advantageously arranged on the inner and outer envelope surfaces. This allows a space-saving arrangement with the cables, and therefore the use of guide rings with a smaller diameter. It may be expedient to provide the same angle separation for the arrangement of the cables on the inner and outer envelope surfaces. This allows cable pairs to be formed, for example from two arranged on the outside and one on the inside, which have a particularly advantageous field line profile.

The guide ring expediently has a circumference which is greater than the added thickness of the cables arranged along the circumference, to be precise by a factor of 1.7 to 2.2. It has been found that this circumferential size results in an optimum ratio of the space required and an adequate separation between the individual cables in the event of severe twisting.

According to one preferred embodiment, which may require separate protection, flexible strain relief is provided on the nacelle for the cables which are hanging into the tower. This is advantageously in the form of a mesh which surrounds the cable and has a suspension device at its upper end. This allows the cables to be suspended on the nacelle in a manner which is functionally reliable and robust even in the event of severe twisting, as well. The mesh allows flexibility for angle deflections such as those which occur during twisting and in the process also tolerates twisting of the cable section within the mesh. Furthermore, the mesh offers the advantage that it tightens when subjected to heavy load, thus providing a self-securing effect. It is also particularly suitable for large and heavy cables.

It has been found to be particularly advantageous for the cables also to be continued separated when routed further in the nacelle. In particular, it is preferable for the cables to be arranged by means of metallic supports such that they are combined on the basis of phase systems, and the respective phase systems are guided separately by metallic supports, in order to avoid inductive heating of the support. An arrangement such as this increases the current load capacity of the cables, because of the reduced heating of the cables. For example, the cable reduction factor may be increased from about 0.55 to about 0.75, while continuation of the cable run in the area of the nacelle in a harness leads to an increase in the reduction factor by about 10% (see also DIN VDE 0298—Part 4). The higher current load capacity of the cables allows the choice and number of the cables in this area to be optimized for the load level and/or costs.

According to one preferred embodiment, signal cables with a small diameter may, however, be guided freely suspended in a harness in the interior of the guide rings. This has the advantage that, when the tower is caused to oscillate, the signal cables cannot carry out such severe oscillations because of the limiting by the guide ring, and are therefore less severely mechanically loaded.

BRIEF DESCRIPTION OF THE DRAWINGS

The invention will be explained in the following text using the example of one advantageous embodiment. In the figures:

FIG. 5 a)-c): show a geometric illustration relating to cable twisting;

FIG. 6: shows strain relief for the cables;

FIG. 7: shows an enlarged partial view of the loop guide and length compensation device.

DETAILED DESCRIPTION OF THE INVENTION

Figure 1:
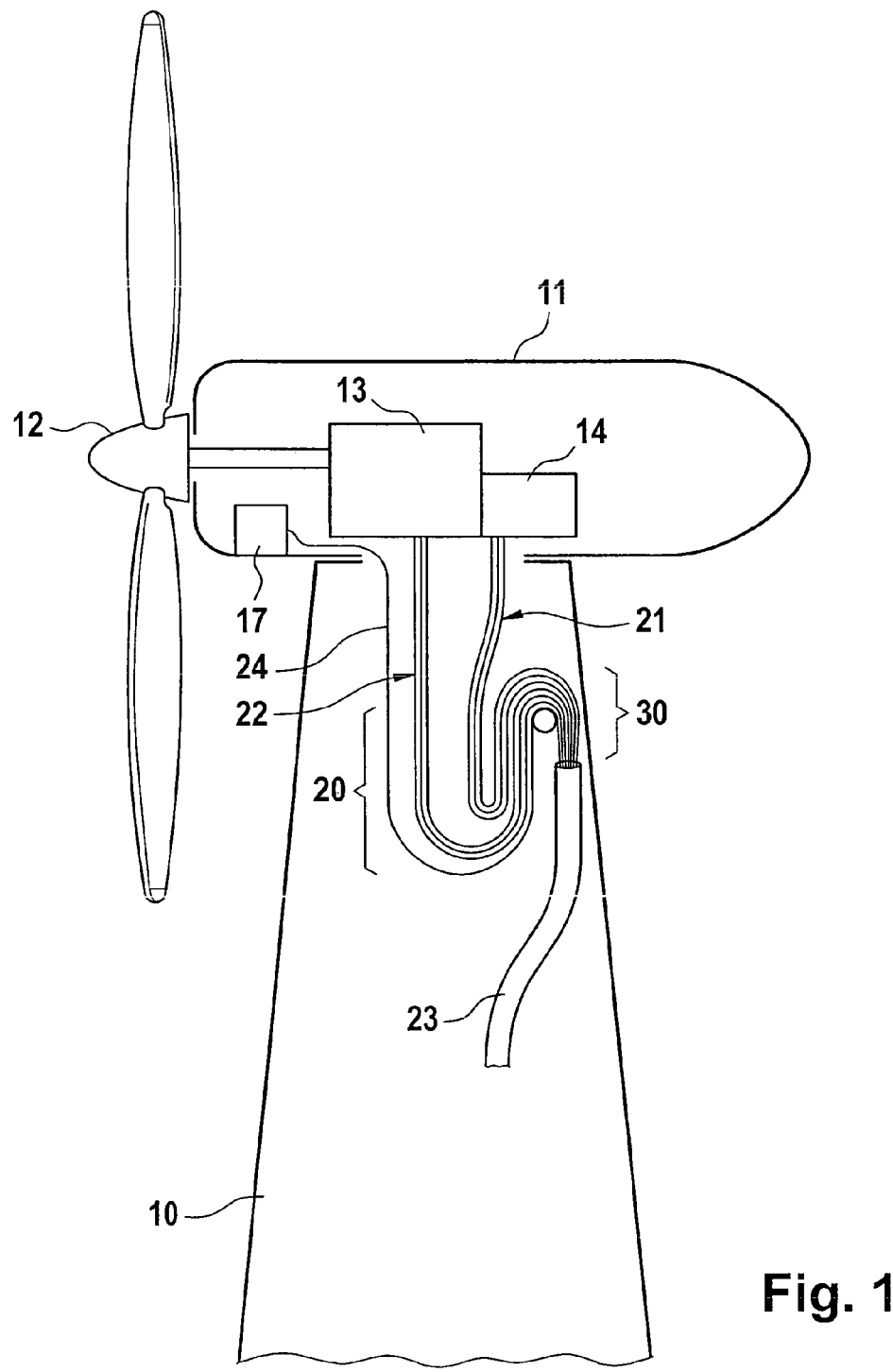
FIG. 1: shows a schematic illustration of a wind energy installation according to one exemplary embodiment of the invention.

One exemplary embodiment of a wind energy installation according to the invention comprises a tower 10 with a nacelle 11 at its upper end. This is arranged such that it can swivel in the azimuth direction, by means of a motor or bearing, and has a rotatable wind rotor 12 on its end face. Via a drive shaft (not illustrated), it drives a generator 13, which is arranged in the nacelle and has a converter 14, converting the mechanical drive power of the wind rotor 12 to electrical power. In order to output the electrical power that is produced, a cable is arranged in the tower 10, comprising a plurality of cables 21, 22 for connection to the stator or rotor of the generator 13 (and possibly further signal cables 24 to an operating control system 17 for the wind energy installation), and a section 23, which hangs downward in the tower 10. The cables 21, 22 are guided from the nacelle 11 into the tower 10 by means of a loop 20 and an opposing loop 30.

Reference will now be made to FIG. 7, which shows details relating to the loop guide 3 and the length compensation device 4. The loop guide 3 comprises an upper and a lower guide ring 31, 32, which are arranged one above the other coaxially, separated by about 3 m. The lower guide ring 32 is arranged in a rotationally fixed manner on a rocker 41 of the length compensation device 4, to be precise via a journal bearing 43, which acts on both sides and in which the individual bearing journals are diametrically opposite. This allows the lower guide ring to carry out a tilting movement, although it is secured against rotation about its center axis. From a rotational point of view, it therefore forms a fixed bearing for the cables 21, 22, and therefore restricts the twisting to the stretched area 21, 22, which is located above this and leads at the top to the nacelle 11. The upper guide ring 31 is in contrast arranged loosely, that is to say it is attached only to the cables 21, 22. It can therefore freely follow the twisting of the cables as the nacelle 11 swivels, thus, from the rotational point of view, forming a loose bearing. This therefore allows the stretched area to be twisted.

The rocker 41 is attached to the inside of the tower 10 via a swiveling bearing 42. The rocker 41 can move up and down in the tower 10, as a result of which the lower guide ring 32, which is arranged at its free end, is moved to and fro with respect to the upper guide ring 31. Because of this change in the separation between the two guide rings 31, 32, the size of the loop 20 which is formed by the cables 21, 22 changes. Furthermore, a direction change 35 is provided, over which the opposing loop 30 is passed and from where it merges into the section 23 which hangs into the tower 10. The direction change 35 holds the weight of the hanging section, and therefore keeps the loop together with the length compensation device 4 largely free of negative influences from the weight force of the hanging section. For this purpose, the direction change 35 can be provided with a coating 36 which increases the friction, or this can be ensured by attachment devices for providing adequately firm pressure on the cable harness 23.

The loop guide 3 and the length compensation device 4 are preferably arranged between two intermediate floors 16, 16'. This ensures good access for maintenance. Because of the space-saving design according to the invention, an intermediate space with a height of about 5 m is sufficient even for tall wind energy installations with towers with a height of more than 70 m.

Figure 2:
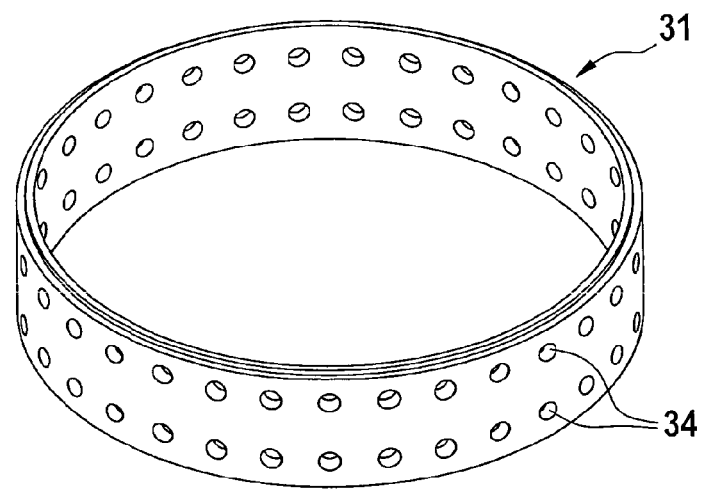
FIG. 2: shows a perspective view of the guide rings.
Figure 2:
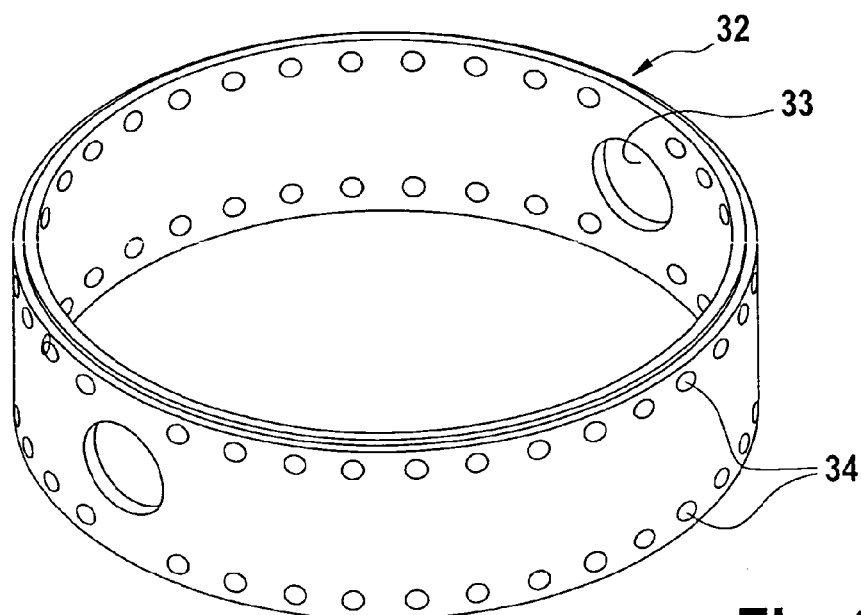
Figure 3:
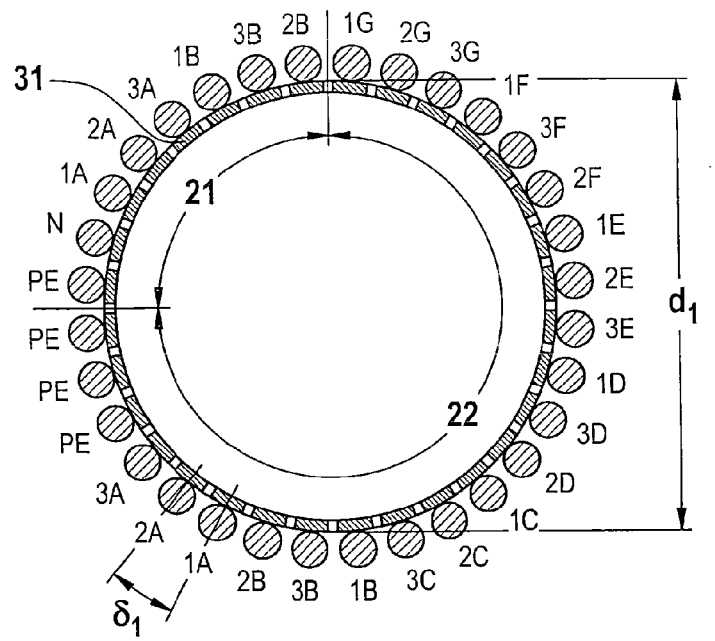
FIG. 3: shows a first cable arrangement on the guide rings.
Figure 3:
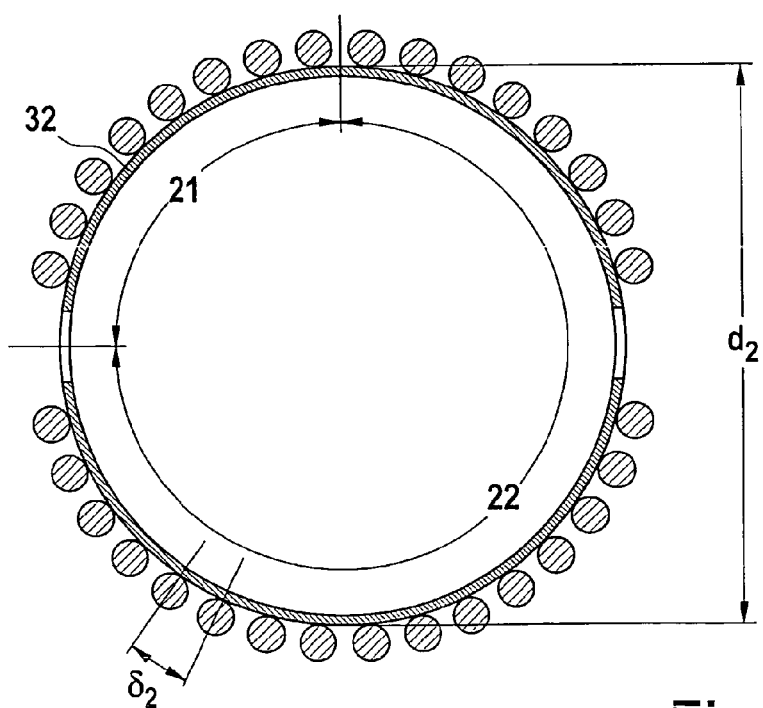
Figure 4:
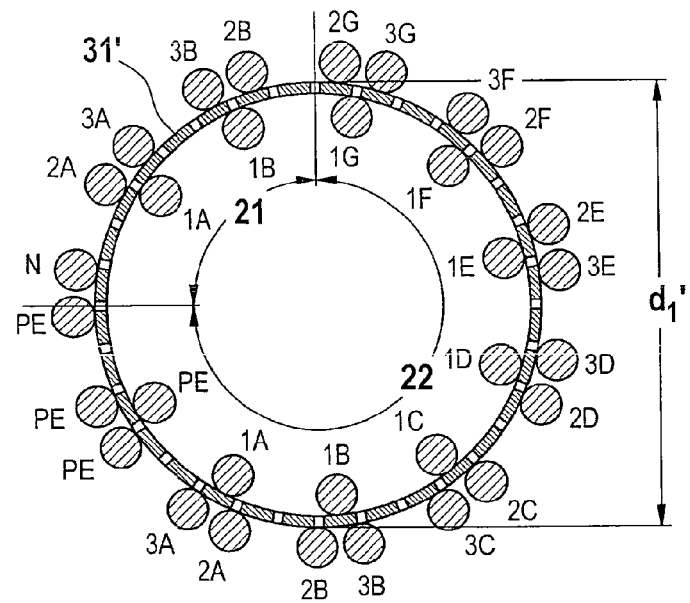
FIG. 4: shows a second cable arrangement on the guide rings.
Figure 4:
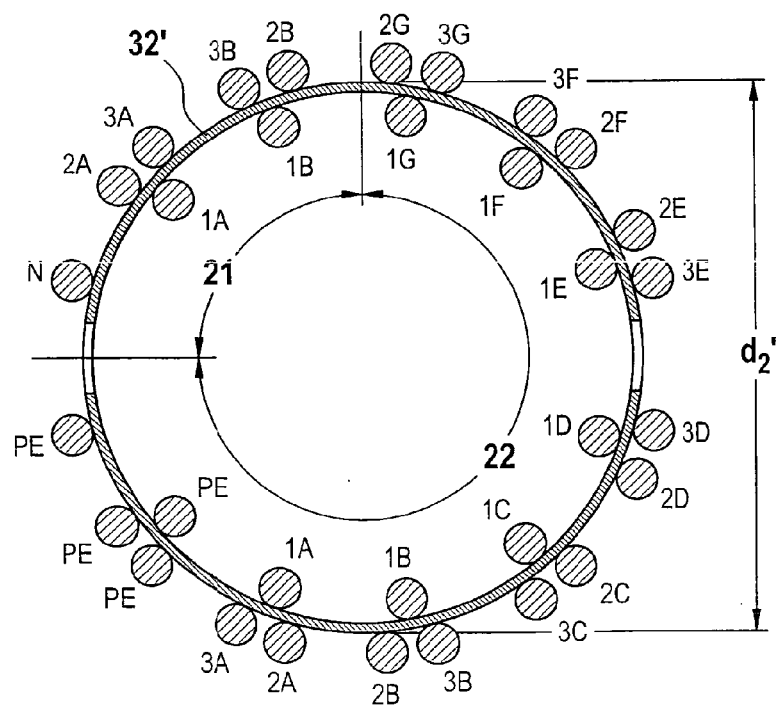

FIG. 2 illustrates details relating to the upper and lower guide rings 31, 32. These have different diameters, with the upper having a diameter d1 and the lower having a diameter d2. These comprise a multiplicity of radial holes, which are used as receptacles 34 for commercially available attachment devices for the individual cables 21, 22. The receptacles 34 are arranged at equal intervals on the respective ring, with a free space 33 for accommodation of the bearing journal 43 existing on the lower guide ring 32. In this case, the separations between the receptacles 34 on the upper and lower guide rings 31, 32 are matched to one another such that the angle separation δ1 on the upper guide ring 31 is equal to the angle separation δ2 on the lower guide ring 32. This is illustrated in FIGS. 3 and 4. The cables 21 to the rotor and the cables 22 to the stator are arranged grouped on the outer envelope surface of the upper and lower guide rings 31, 32 (FIG. 3). It is also possible for the cables 21, 22 to be arranged on both sides, that is to say on the inner and outer envelope surfaces (FIG. 4). This has the advantage that the guide rings 31', 32' may have smaller diameters, d1' and d2'. This not only allows a space-saving design, but also allows an arrangement which is optimized from the aspect of distribution of the electrical and magnetic fields, in compact groups of three (in the case of a conventional three-phase system).

The determination of the twisting and of the diameters of the guide rings 31, 32 will be explained in the following text with reference to FIG. 5. FIG. 5a illustrates the cable section which forms the loop 20 in the untwisted state, that is to say the nacelle 11 is in its normal position of 0° with respect to the tower 10. The cable section which forms the loop has a length a of 7 m. The individual cables 21, 22 are illustrated schematically via elongated lines in the cable section; in the untwisted state, they run parallel to the axis. FIG. 5b illustrates the same cable section in the twisted state, to be precise for maximum permissible twisting of 1080°, corresponding to three complete revolutions in either direction. The individual cables 21, 22 are now at an angle γ, because of the twisting (the illustration in FIG. 5b is schematic; the idealized position corresponds to that of an elongated "thread pitch" on a screw, with each cable 21, 22 representing one screw thread). This twisting results in the cable section being shortened by the amount Δ, as a result of which its effective length is now only b, where b=a−Δ. The relationship between the stretches and angles is illustrated in FIG. 5c. The amount of space required at the side for the individual cables 21, 22 is increased because of the angled position, to be precise being increased by the reciprocal of cos γ. In order to prevent the individual cables 21, 22 from touching even when twisted to the maximum extent, and in order thus to maintain the complete wear protection, the individual cables 21, 22 must be arranged with a correspondingly large radial separation on the guide rings. A numerical example of this now follows:

The length a is 7 m and the maximum twist is 1080°. The diameter of the (smaller) guide ring is 400 mm (circumference 1370 mm) and the diameter of the individual cables is 36 mm. At the end of the cable section, the individual cable 21, 22 has therefore been moved through a radial distance of 4.1 m when twisted to the maximum extent. The effective length of the cable section has therefore been shortened (Pythagoras' Theorem) to a value b of 5.67 m, that is to say the cable section has been shortened by Δ=1.33 m. This results in a value of 54° for the angle β, using the relationship sin β=a/b (see FIG. 5c), and a value of 36° for the angle γ=90°−β. The effective diameter of the individual cables in the radial direction of the guide ring is therefore increased by the reciprocal of cos γ, thus resulting in an effective diameter of 44 mm. If, as is illustrated in FIG. 4, 22 cables are arranged on the outer envelope surface, this therefore results in a space requirement at the circumference of 22×44 mm=978 mm, that is to say the actual circumference of 1370 mm is sufficiently large. This therefore results in a factor of 1.72 between the added diameters of the individual cables and the actual circumference. The undesirable touching of the individual cables can be reliably prevented, even when twisted to the maximum extent.

Flexible strain relief, as is illustrated in FIG. 6, is provided for the suspension of the individual cables 21, 22 on the nacelle, in order to ensure that they are held securely and that they have adequate freedom of mobility. This flexible strain relief comprises a piece of mesh 51, which is looped tightly around the individual cables 21, 22. The cable 21, 22 is secured against sliding out, by means of the friction force. Because of the mesh structure, the mesh contracts as a result of the tension being exerted by the cable 21, 22, thus resulting in a self-securing effect. This therefore ensures that even large and heavy cables are held securely. In this case, the mesh retains its flexibility, as a result of which it has an adequate deformation capability to hold the cable even under the influence of the twisting. A cable eye 52 is provided for attachment at the upper end, and is attached to the nacelle 11 by means of a screw, hook or similar attachment element.

Figure 8:
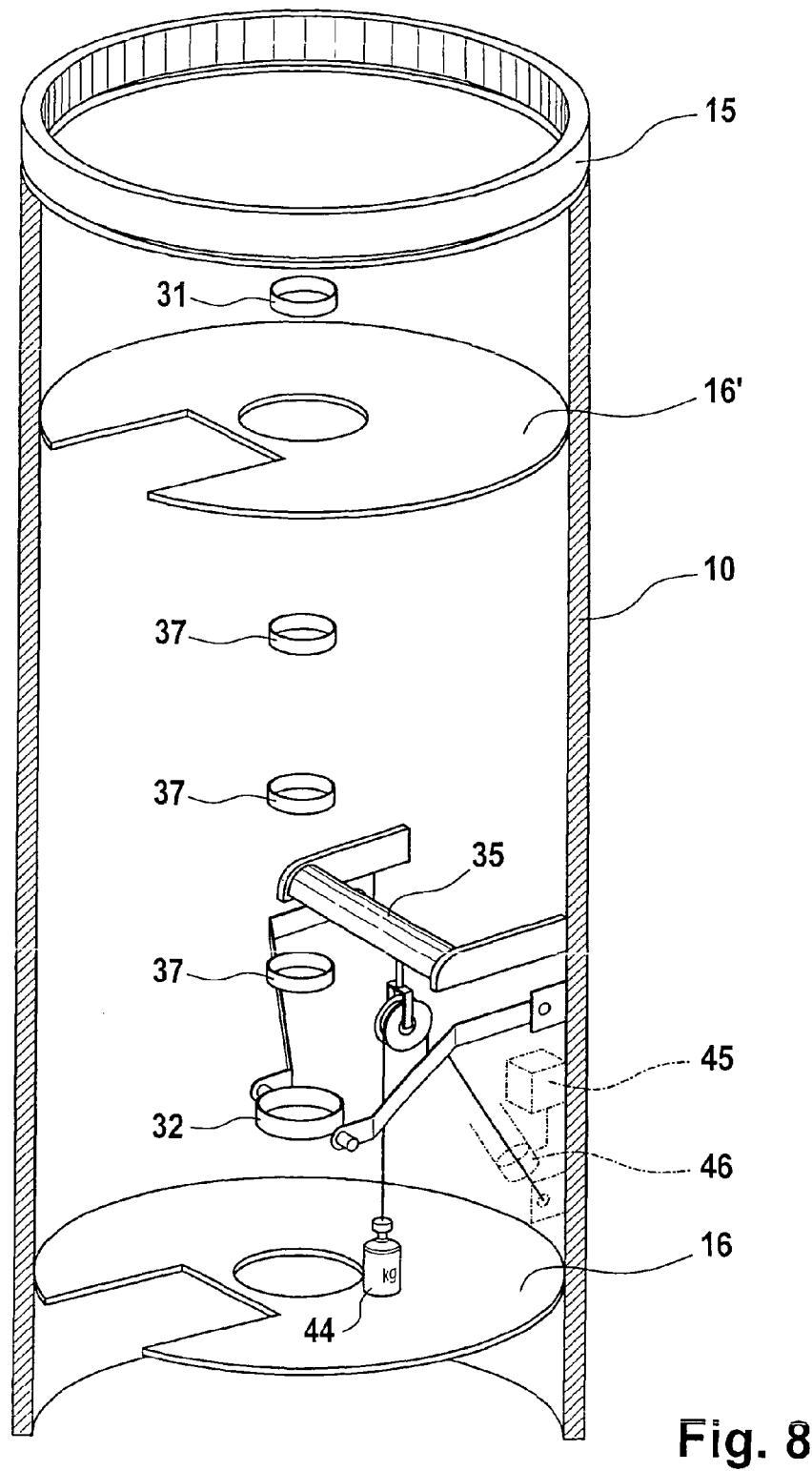
FIG. 8: shows another partial view with optional accessories.

FIG. 8 shows an overview of the loop guide 3 and the length compensation device 4 in the tower 10. A number of options are additionally illustrated. For example, a plurality of intermediate rings 37 are illustrated between the upper guide ring 31 and the lower guide ring 32. These are arranged loosely, in the same manner as the upper guide ring 31. While the upper guide ring 31 in general rotates with the nacelle 11, the intermediate rings 37 rotate only partially therewith, with the extent to which they rotate therewith decreasing from top to bottom. The intermediate rings 37 ensure that the position of the cables 21, 22 with respect to one another is maintained even in the case of relatively large loops.

Furthermore, a counterweight 44 is illustrated for the length compensation device 4. Its mass is designed to compensate for at least half of the weight force of the cable, taking account of the lever effect. The length compensation device 4 can therefore be operated largely freely of negative influences caused by the weight of the cables 21, 22. Alternatively, active compensation can be provided (illustrated by dashed lines). This comprises a control device 45 which uses a signal originating from the operating control system 17 relating to the twist angle to determine the effective shortened cable length b, and correspondingly adjusts the rocker 41 via an actuator 46, in order to compensate for the shortening A.

The invention claimed is:

1. A wind energy installation comprising:
a tower;
a nacelle arranged at the top of the tower such that the nacelle can swivel in the azimuth direction; and
a plurality of cables which are guided via a loop from the tower into the nacelle, the cables being held at a distance from one another in the loop by rotationally fixed and loose holders, the holders each having receptacles for attachment of the cables with a predetermined circumferential separation,
wherein the holders comprise a lower rotationally fixed guide ring and an aligning upper loose guide ring, the aligning upper loose guide ring is attached to the cables only, and a loop guide is formed such that the loop is subdivided by the rotationally fixed lower guide ring into a curved untwisted area and an extended twisted area.

2. The wind energy installation of claim 1, further comprising a length compensation device configured to move the lower guide ring with respect to the upper guide ring depending on the twist angle.

3. The wind energy installation of claim 2, wherein the length compensation device is configured to interact with a direction change which forms an opposing loop and has the weight force of a hanging section of the cables.

4. The wind energy installation of claim 2, wherein the length compensation device comprises a counterweight configured to compensate for a weight force of the hanging section.

5. The wind energy installation of claim 2, further comprising a control device configured to determine a load acting on the cables because of the twisting and operate an actuator in order to shorten the loop.

6. The wind energy installation of claim 1, further comprising a two-sided bearing for the rotationally fixed lower guide ring.

7. The wind energy installation of claim 1, further comprising at least one additional central guide ring.

8. The wind energy installation of claim 1, further comprising receptacles for the cables.

9. The wind energy installation of claim 8, wherein the receptacles are arranged on both sides on an inner and an outer envelope surface.

10. The wind energy installation of claim 1, wherein the loose guide ring has a smaller diameter than the fixed guide ring.

11. The wind energy installation of claim 1, wherein the loose and the fixed guide rings have a circumference which is greater by a factor of 1.4 to 2.8 than the added thickness of the cables.

12. The wind energy installation of claim 1, wherein flexible strain relief is provided on the nacelle for the cables which are hanging into the tower.

13. The wind energy installation of claim 12, wherein the strain relief is a mesh piece which surrounds the cable and has a suspension device at its upper end.

14. The wind energy installation of claim 1, wherein the plurality of cables is twistably guided via the loop from the tower into the nacelle.

15. The wind energy installation of claim 6, wherein the two-side bearing for the guide ring is configured to allow tilting about a horizontal axis.

16. The wind energy installation of claim 7, wherein the at least one additional central guide ring is loose.

17. The wind energy installation of claim 8, wherein the receptacles for the cables are arranged at equal intervals on an envelope surface of the guide rings.

18. The wind energy installation of claim 1, wherein the loose and the fixed guide rings have a circumference which is greater by a factor of 1.7 to 2.2 than the added thickness of the cables.

* * * * *